United States Patent Office 2,724,497
Patented Nov. 22, 1955

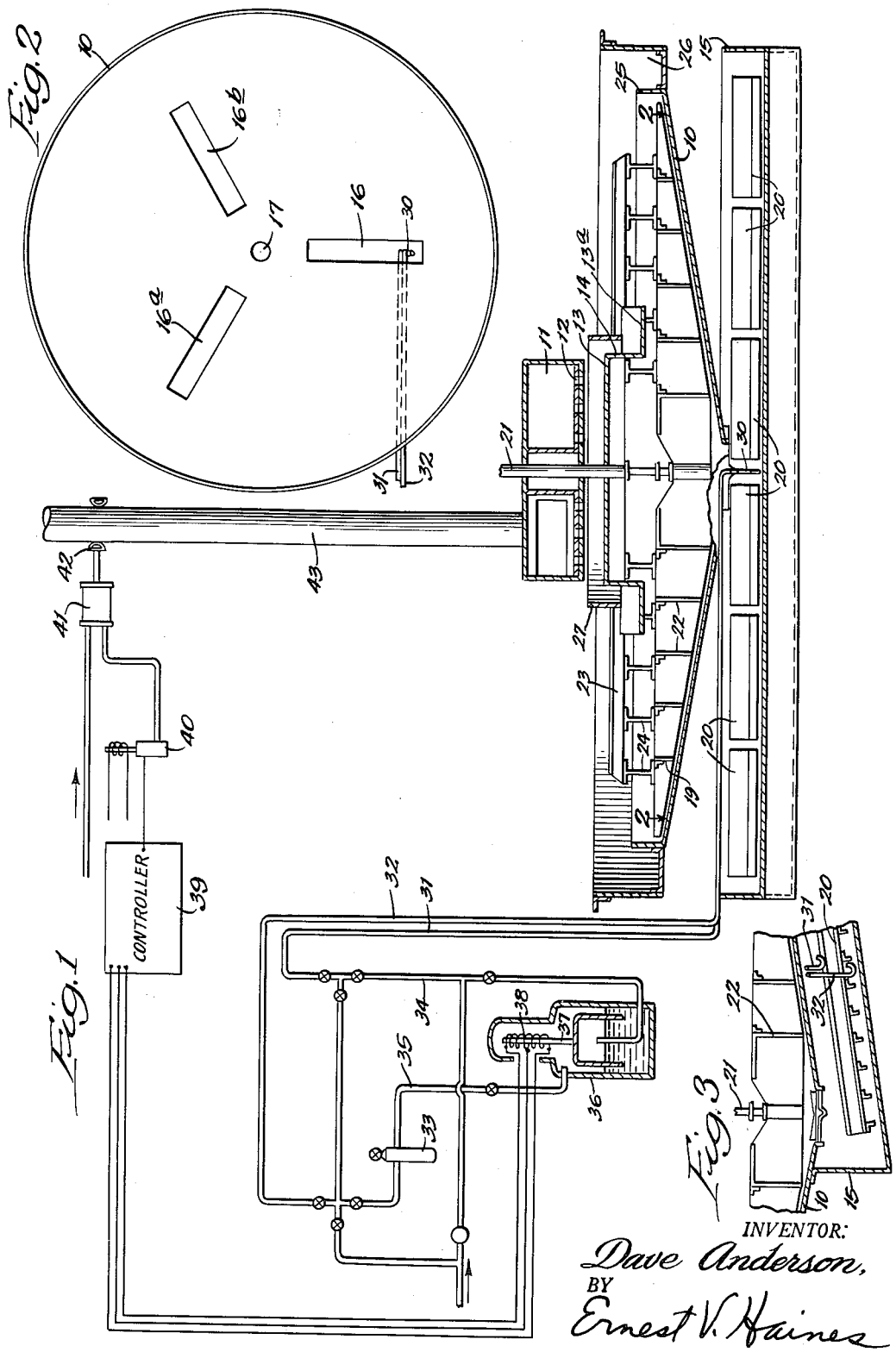

2,724,497

METHOD OF CONTROLLING SOLIDS ACCUMULATION IN DEWATERING APPARATUS

Dave Anderson, Mulberry, Fla., assignor to International Minerals & Chemical Corporation, a corporation of New York Application May 2, 1952, Serial No. 285,679

5 Claims. (Cl. 209—18)

This invention relates to the dewatering of slurries. More particularly, it relates to the control of the rate of discharge of solids from dewatering apparatus. Still more particularly, it relates to control apparatus providing a relatively constant high solids consistency slurry discharge from solids dewatering apparatus such as a bowl classifier.

In order to secure a clean granular ore feed for processing operations, it is necessary that the solids be free of fine material called slimes. The slimes may be gangue or foreign material, or it may be fines produced by particle size reduction operations. These fines are removed from the granular material by washing operations in which the ore in dilute solids form is agitated. After agitation, the dilute solids form is fed to such equipment as hydroseparators, thickeners, and the like, where gravity separation is effected. Heavy gravity solids are withdrawn from the bottom of this type equipment while excess water and finer particles overflow at the periphery of such thickeners.

One particular type of equipment in common use for this purpose, is the bowl classifier having a shallow or cone shape bottom, superimposed upon an upwardly sloped trough equipped with reciprocating rakes. Solids settling to the bottom of the bowl are accumulated and moved to a central dropout or well, through which the solids pass to the upwardly sloped ramp or trough and are then moved stepwise by the reciprocating rakes upwardly until they are in a position to drain out of contact with wash water during several progressive steps. The solids in the form of a heavy consistency solids are then discharged by gravity from the slanting ramp or trough. This classifier equipment has several disadvantages. Rakes generally move material trapped between flights of the rakes a distance slightly in excess of the distance between flights. The rakes move whatever material is dropped and therefore the rate of discharge of dewatered solids varies directly with the feed rate of solids in suspension. Inasmuch as slurries containing solids of varying particle size tend to accumulate and pass alternately high solids and low solids density slurry, the operation of bowl classifiers has always been erratic and requires the constant attention of operators to maintain a reasonable uniform delivery of dewatered solids.

It is an object of the present invention to overcome the disadvantages and shortcomings found in the method of control for dewatering operation.

It is a further object of this invention to smooth out classifier operations and to improve the effectiveness of the separations made in a hydro-bowl.

It is still another object of this invention to control the bowl operation so as to provide a relatively constant rate of delivery of solids.

It is still a further object of this invention to make hydro-bowls operations automatic and eliminate the need for manual operation of classifiers.

It is still further, an object of this invention, to eliminate surges in the delivery of solids and to provide a relatively constant weight of dewatered solids as feed for subsequent processing steps.

It is a further object of this invention to provide a method of delivering a constant weight of feed to the reagentizing unit of phosphate flotation system.

These and other objects of the invention will be apparent to those skilled in the art, from the following descriptions:

It has been discovered that measurement of differential static head or pressure, which constitutes a measurement of the density of the slurry, can be measured only in a limited area of the classifier. Measurements of differential static pressure outside of this restricted area are not directly relatable to the density of solids being accumulated and raked in the bowl and therefore are not useful for the control of the operation of the classifier. For example, measurements can not be made within the pool in the hydro-bowl due to the interference of agitation created by the rakes, nor at the central drop-out, due to slugging of rake discharge.

Briefly, the method of this invention comprises continuously introducing a slurry to a primary settling zone, subjecting the solids to an initial separation in said primary settling zone, inducing the partially settled solids and the liquid associated therewith, to move in a cross sectionally restricted vertical path from the primary zone downwardly to a secondary settling zone, maintaining a transverse path of withdrawal movement for settled solids in a secondary zone, measuring the slurry density in said vertical path, regulating the rate of introduction of slurry to conform the flow inversely to the density measured and continuously removing solids from said secondary settling zone at a substantially constant rate.

Briefly, the apparatus comprises a cone shaped settling tank or hydro-bowl, at least one solids outlet aperture in the bottom of said bowl, an overhead feed inlet conduit, fluid flow control means on said feed inlet conduit, actuating means for said fluid flow control means, a trough extending from beneath said outlet aperture of said bowl, solids removal means operable within said trough, actuating means for said solids removal means, density measuring means positioned between the cone and said trough, said density measuring means also being positioned below one of said solids outlets in said cone, an impulse conveying means connecting the density measuring means to said actuating means for said fluid control means.

In more detail, the apparatus comprises a cone bottomed settling tank or hydro-bowl, a rotating rake mechanism operating within said bowl, at least one solids outlet aperture in the bottom of said bowl besides the apex, a feed inlet conduit discharging through an annular feed box centrally located in said bowl, a fluid flow control means on said feed inlet conduit, actuating means for said fluid flow control means, an upwardly inclined trough extending from beneath said bowl to a point of elevation above the bowl overflow lip, reciprocating rakes within said trough, actuating means for said rakes, density measuring means positioned between the bottom of said cone and said trough, said density measuring means also being positioned below one of said apertures and between two of said rakes, an impulse conveying means connecting said density measuring means to the actuating means for said fluid control means.

Settling of slurries as discussed herein, requires that the solids be partially concentrated and the measurement thereof made, while the particles are still suspended in a liquid medium and not at rest. Slurries fed to bowl classifiers generally have a solids content in the range between about 30% and about 50%. Material discharged by the rakes generally have a solids content in the range of about 65% to about 80% solids. Partially concentrated slurries have a solids content generally, though not necessarily intermediate these ranges. By the partial concentration, a slurry is obtained giving a measure of the consistency of the material being raked and at the same time, a measure of the degree of separation achieved when a feed settles a fixed distance.

By the nature of a bowl classifier, a pool of liquid of uniform depth is maintained inasmuch as the cone itself permits liquid to overflow the upper rim and discharges partially concentrated solids through the drop-outs. These drop-out portions at all times are submerged in a pool of liquid accumulated in the rake trough. Thus, as the solids pass from the cone vertically downward, they exist in the form of a slurry, more dense in character than the feed which settles by gravity in a defined path, negligibly disturbed by currents set up by moving equipment present in the secondary zone existing below the cone.

Measurement of the density of this cross sectionally defined vertical stream may be made by any device suitable for the purpose. Such density measuring equipment may consist of fluid purged immersed tubes providing a measure of differential static pressure, non-purged balanced diaphragm devices providing a measure of differential static pressure, an immersed plummet of the type whose tendency to float due to buoyant forces, is opposed as by a spring or by slack chains permitting a finite movement proportional to density which may then be converted to a useable signal such as an electrical or pneumatic impulse.

This signal, whatever its form, may then be used to govern the operation of the actuating means for the fluid flow control means. The actuating means may be either pneumatic, hydraulic or electric in nature. For example, the actuating means for a valve controlling fluid flow through the inclined conduit may be controlled by pneumatic or hydraulic diaphragm motors or piston actuators or an electric motor. The actuating means may also be a variable speed operated pump of any suitable type actuated by any suitable speed drive.

When the density of the solids is being automatically controlled, variations in the solids content at the base of the defined or restricted cross sectional path is markedly varied when the feed is varied. As a result of controlling the feed for constant density there is a regulation of flow which functions to minimize fluctuations in slurry density at the bottom of the base of the defined cross sectional path and the rake flights on each reciprocating action take a bite out of solids of a substantially constant consistency. Movement up the inclined trough produces a relatively uniform depth of solids, which solids thus discharge to a conveyer belt or other conveying apparatus at a substantially constant gravimetric rate.

The invention will be more fully understood from the following description of the preferred embodiment of this invention which is given in conjunction with the drawings in which:

Figure 1 is a vertically sectional view of a bowl classifier with density control mechanism.

Figure 2 is a view along the line 2—2 of Figure 1.

Figure 3 is a portion of a side elevational view of the classifier shown in Figure 1, showing the positioning of the bubble tubes.

In the drawings, the numeral 10 indicates a cone-shaped tank or hydro-bowl. Hydro-bowl 10 is provided with an annular well or feed sump 11. The bottom of the well 11 is perforated, as at 12, for retarded escape of material therethrough onto a distributing plate 13, positioned thereunder. Distributing plate 13 shoulders off, as at 14 to a lower level providing a peripheral flange 13a.

Below cone shaped tank 10 is a secondary settling tank 15 in the form of an inclined trough. Tanks 10 and 15 communicate through slot openings 16, 16a, 16b, and 17, in the bottom of tank 10. Both tanks 10 and 15 are provided with mechanical rakes, the radial rake or sweep 19 in tank 10 impelling settled material to the slot openings whereas the blade rakes 20 in tank 15 impel the settled material therein up the inclined bottom of tank 15 and into any suitable receiving means.

Above bowl 10 is a superstructure (not shown) upon which is carried a means of rotational power for rotation of shaft 21. Shaft 21 is axially disposed with respect to the bowl and carries the rake 19 at the lower part of the shaft, thereby rotating said rake by virtue of direct connection between said parts. As is usual with devices of this type, rake 19 has blades or scrapers 22, extending closely adjacent to the bottom of the bowl, as well as rake arms 23 perpendicular to shaft 21, but positioned above the normal level of the fluid in the tank. Blades 22 are carried by a bracket 24 depending from arms 23.

Slurry fed into bowl 10 is separated into an underflow which drops into the secondary tank through slots 16, 16a, and 16b, while the liquid overflows the entire circumference of the bowl over a circumferential weir 25 into a launder 26.

The specific structure shown is such that disk plate 13 is carried upon the upper edges of the radial rake arms while the apron 13a is positioned below the surface of solution in the bowl 10. Above flange 13a, is positioned a baffle ring 27. By this construction, the entering material is spread over a considerable area and enters the bowl at a material distance from the center thereof, so as not to interfere in any way with the liquid upflow through the openings 16, 16a, 16b and 17. This upflow is caused mainly by the back wash supplied to the inclined trough 15.

Rakes 20 extend below slots 16, 16a, and 16b. Below the slot 16 and between the two innermost rakes 20, is positioned the density measuring means 30, in this instance consisting of an upper air-purged tube 31 and a lower air-purged tube 32. Tubes 31 and 32 are vertically spaced with outlets approximately 15 inches apart, with the bottom tube outlet positioned approximately 8 inches above the floor of the trough 15. Air under pressure (from a source not shown) is passed through tubes 31 and 32 and a mercury level bubbler 33. Air pressure lines 31 and 32 are each connected by branch pipes 34 and 35 respectively, to opposite sides of a diaphragm mechanism 36, free to move in response to differences in back pressure in the respective lines and thereby converting differential air pressure into an electrical signal by displacement of a core 37 in an electrical coil system 38, thereby unbalancing an impedance bridge system. With regard to the valves diagrammatically illustrated on the drawing in the air circuit, it will be appreciated that under automatic operating conditions the valves, except for the one controlling the direct communication between lines 31 and 32, will be open so that variations in pressure resulting from air bleed from tubes 31 and 32 will be effective to position core 37 in accordance with the difference in pressure existent between the two tubes.

The electrical unbalance of coil 38 is transmitted by a three wire system to a secondary coil or controller system 39, adapted to actuating a proportional-plus-reset controller 40 which governs the air pressure supply to an air cylinder 41 in such fashion as to minimize the difference between controller index setting and increased density signal. Air cylinder 41 which may be of the spring bias type is directly connected to valve 42. Valve 42 controls slurry fluid in inlet pipe 43, feeding sump 11. A control circuit arrangement suitable for adaptation in effecting control of the slurry inflow in response to the density of material flowing from the bowl outlets is disclosed in Krogh Patent 2,223,356, December 3, 1940.

In phosphate recovery operations, Florida pebble phosphate is ground and sized to produce a comminuted material having particles in the range of 35 mesh to 200 mesh size. The sized or screened particles are washed to remove slimes. The slurry produced in washing is dewatered in a hydro-separator. The overflow solids are next sent to storage. Material withdrawn from storage is slurried and sent to a bowl classifier of the type described above. The solids are discharged by the rakes of the classifier at a rate of approximately 425 tons per day. This is an increase in feed to the reagentizing tanks of approximately 2.5% over the average maintainable feed rates, without the automatic control mechanism described above.

Improved results from constant delivery of solids from the classifier also are reflected by the fact, that this increased feed is handled with only two to three per cent increase in quantity of reagents. Secondly, this reduction in quantity of reagents is accomplished while at the same time effecting approximately a 2% increase in phosphate recovery, due to the increased accuracy of reagent proportioning made possible by constant plant feed tonnage rate. Stated another way, there is an increase recovery of approximately 80 tons of floatable product per day.

Having thus fully described my invention, what is desired to be secured by Letters Patent is:

1. A method of procuring a substantially constant flow of dewatered solids which comprises: continuously introducing slurry into a primary settling zone, removing accumulated solids and the liquid associated therewith from the bottom of said primary settling zone in a cross-sectionally restricted vertical path into a secondary settling zone, determining the slurry density in said vertical path, controlling the rate of introduction of slurry into said primary settling zone to conform the introduction rate inversely to the density of the slurry, and continuously removing solids at a substantially constant rate from said secondary settling zone.

2. Dewatering apparatus comprising a cone shaped hydro-bowl, at least one solids outlet aperture in the bottom of said bowl, a feed inlet conduit, a fluid flow control means on said feed inlet conduit, actuating means for said fluid control means, a trough extending from beneath said outlet aperture of said bowl, solids removal means operable within said trough, actuating means for said solids removal means, density measuring means, positioned between the cone and said trough, said density measuring means also being positioned directly below an outlet aperture in said cone, and an impulse conveying means connecting the density measuring means to said actuating means for said fluid control means.

3. Dewatering apparatus comprising a cone shaped hydro-bowl, at least one solids outlet aperture in the bottom of said bowl, a feed inlet conduit, fluid flow control means on said feed inlet conduit, actuating means for said fluid flow control means, a trough extending from beneath said outlet aperture of said bowl, solids removal means operable within said trough, actuating means for said solids removal means, a pair of bubble tubes having the outlets therefrom vertically spaced, said outlets being positioned directly below the aperture in the bottom of said bowl and intermediate said bowl and said trough, differential pressure measuring means connected between said bubble tubes and adapted to produce an electrical signal, and an electrical signal responsive means proportionally governing the actuating means for said fluid flow control means connected to said differential pressure measuring means.

4. Dewatering apparatus comprising a cone shaped hydro-bowl, at least one solids outlet aperture in the bottom of said bowl, an annular feed sump, a feed inlet conduit directed into said sump, fluid flow control means on said feed inlet conduit, actuating means for said fluid flow control means, an upwardly inclined trough extending from beneath said outlet aperture of said bowl to a point in elevation above the bowl rim, solids removal means operable within said trough, actuating means for said solids removal means, a pair of bubble tubes having the outlets therefrom vertically spaced, said outlets being positioned directly below the aperture in the bottom of said bowl and intermediate said bowl and said trough, differential pressure measuring means connected between said bubble tubes and adapted to produce an electrical signal, and an electrical signal responsive means proportionally governing the actuating means for said fluid control means connected to said differential pressure measuring means.

5. Dewatering apparatus comprising a cone shaped hydro-bowl, at least one solids outlet aperture in the bottom of said bowl, a feed inlet conduit, valve means on said feed inlet conduit, actuating means for said valve means, a trough extending from beneath said outlet aperture of said bowl, reciprocating rakes operable within said trough, actuating means for said solids removal means, a pair of bubble tubes having the outlets therefrom vertically spaced, said outlets being positioned directly below the aperture in the bottom of said bowl and intermediate said bowl and said trough, differential pressure measuring means connected between said bubble tubes and adapted to produce an electrical signal, and an electrical signal responsive means proportionally governing the actuating means for said valve means connected to said differential pressure measuring means.

References Cited in the file of this patent

UNITED STATES PATENTS

| | | |
|---|---|---|
| 1,140,131 | Dorr | May 18, 1915 |
| 1,292,237 | Blomfield | Jan. 21, 1919 |
| 1,413,935 | Ramsey et al. | Apr. 25, 1922 |
| 1,460,134 | Johlin | June 26, 1923 |
| 1,518,136 | Dorr | Dec. 9, 1924 |
| 1,541,237 | Trott | June 9, 1925 |
| 1,957,941 | Coe | May 8, 1934 |
| 2,037,761 | Coe | Apr. 21, 1936 |
| 2,135,957 | Wuensch | Nov. 8, 1938 |
| 2,646,169 | Fox et al. | July 21, 1953 |